June 8, 1926.
R. B. HANKS
MAP HOLDER
Filed May 13, 1925
1,588,106
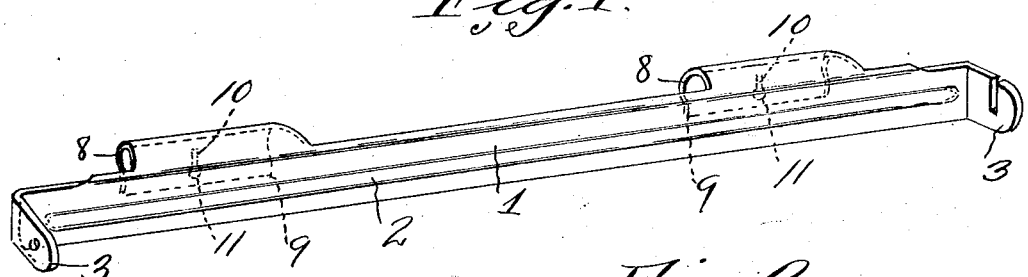
Fig. 1.
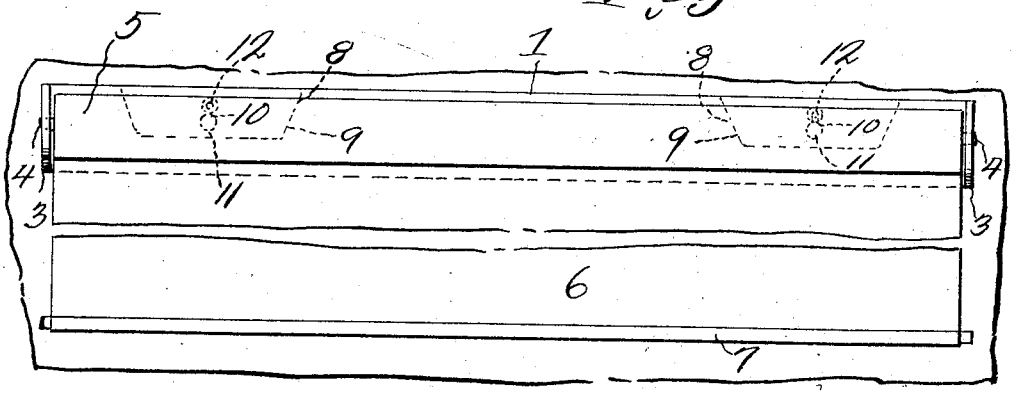
Fig. 2.
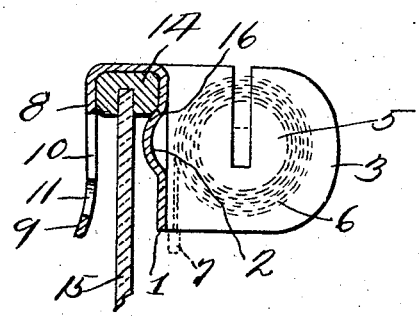 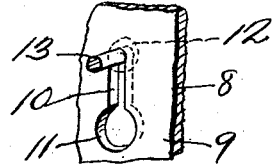
Fig. 3. Fig. 4.
Inventor
Rufus B. Hanks
By Philip A. Newell
Attorney Patented June 8, 1926.

1,588,106

UNITED STATES PATENT OFFICE.

RUFUS B. HANKS, OF WAUSA, NEBRASKA.

MAP HOLDER.

Application filed May 13, 1925. Serial No. 29,982.

The invention relates to map holders, and has for its object to provide a device of this character particularly adapted for use by automobilists, and one which may be easily supported on the upper rail of the windshield frame, or on headed bolts, the instrument board or any other support.

A further object is to provide a map holder comprising an elongated metal strip having a longitudinally disposed reinforcing rib extending rearwardly therefrom and integral rearwardly and downwardly extending arms adapted to engage over a windshield frame rail and in cooperation with the rearwardly extending reinforcing rib prevent the upward movement of the holder on the rail. Also to provide the ends of the metallic strip with outwardly extending arms for the reception of the pintles of a spring roller on which a map is wound, thereby allowing the driver of an automobile to easily unwind the map for consulting the same.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the map holder.

Figure 2 is a front elevation of the map holder.

Figure 3 is a vertical transverse sectional view through the map holder and a portion of a windshield.

Figure 4 is a detail perspective view of a portion of one of the holder spring arms showing a headed supporting member in the slot thereof.

Referring to the drawing, the numeral 1 designates the elongated metallic body member formed from sheet metal, and which body member is longitudinally stiffened by the longitudinally disposed bead 2, which is stamped rearwardly therefrom. The ends of the body 1 terminate in outwardly extending integral arms 3 which receive the pintles 4 of the map carrying roller 5 on which the map 6 is wound. Roller 5 is of a conventional spring roller kind, and therefore it will be seen that if the operator desires to consult the map it will only be necessary for him to grasp the rod 7 carried by the map and pull downwardly thereon, which action will unwind the map from the roller. It will also be seen that when the map is not in use it will be wound around the roller 5, and will not be in the way of the operator. The body member 1 of the holder is provided with rearwardly and downwardly extending L-shaped flanges 8, the downwardly extending portions 9 of which are provided with vertically disposed slots 10, the lower ends of which are provided with enlargements 11, which receive the heads 12 of supporting members 13, and when the members 13 are in the slots 10, the heads 12 thereof prevent outward displacement of the holder.

The supporter 13 may be used on an instrument board or in any other position desired, and may be headed screws if desired. Where the holder 1 is supported on the upper rail 14 of a windshield 15, the portions 9 of the flanges 8 engage the outer side of the rail 14 and the longitudinally disposed bead 2 the inner lower corner of the rail, and prevent upward displacement of the holder on the windshield. Flanges 8 have sufficient spring action to positively hold the holder against movement, consequently rattling of the holder is prevented.

From the above it will be seen that a map holder is provided which is formed from a single sheet of metal and one which may be supported in various positions, for instance on the windshield 15 or on the instrument board, or in any other position desired.

The invention having been set forth what is claimed as new and useful is:—

The combination with a windshield rail, a map holder, of a rearwardly extending bead carried by the map holder and engaging under the inner lower edge of the rail and a rearwardly and downwardly extending spring arm carried by the holder and engaging the upper and outer sides of the rail, said rearwardly and downwardly extending members being provided with headed support receiving slots.

In testimony whereof I hereunto affix my signature.

RUFUS B. HANKS.